UNITED STATES PATENT OFFICE.

PHILIPP OTT, ADOLF ISRAEL, AND RICHARD KOTHE, OF ELBERFELD, GERMANY, ASSIGNORS TO THE FARBENFABRIKEN OF ELBERFELD COMPANY, OF NEW YORK.

BROWN DYE AND PROCESS OF MAKING SAME.

SPECIFICATION forming part of Letters Patent No. 658,506, dated September 25, 1900.

Application filed October 9, 1899. Serial No. 733,038. (Specimens.)

*To all whom it may concern:*

Be it known that we, PHILIPP OTT, ADOLF ISRAEL, and RICHARD KOTHE, doctors of philosophy, chemists, (assignors to the FARBENFABRIKEN OF ELBERFELD COMPANY, of New York,) residing at Elberfeld, Germany, have invented a new and useful Improvement in Brown Azo Dyes; and we hereby declare the following to be a clear and exact description of our invention.

Our invention relates to the production of valuable new brown monoazo dyestuffs by combining the diazo derivative of picranic acid of the formula:

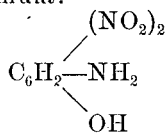

with certain derivatives of metadiamido compounds of the benzene series—viz., the amidoglycins of the benzene series having the formula:

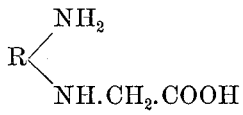

(R meaning a radical of a hydrocarbon of the benzene series, such as benzene, toluene, or the like) or with the monosulfonic acids of the said amidoglycins. The new dyestuffs thus obtained are alkaline salts of acids having the general formula:

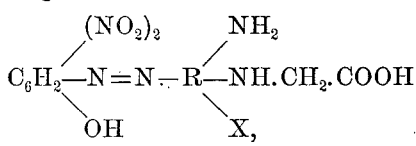

in which R means one of the above-defined radicals, X a hydrogen atom, which may be replaced by a sulfo group. They are dark powders and dye unmordanted wool in acid-baths in general from reddish-brown to brown shades, which by a subsequent treatment with solutions of chromium compounds, such as potassium bichromate or the like, are changed into fast and deep brown shades.

It may be remarked that the above-mentioned sulfonic acids of the amidoglycins can be prepared by treating in a watery solution one molecule of the sodium salt of a metadiamidosulfonic acid of the benzene series—such as metaphenylene diamin monosulfonic acid, metatoluylene diamin monosulfonic acid, or the like—with one molecule of monochloracetic acid in the presence of sodium acetate.

In carrying out our new process practically we can proceed as follows, the parts being by weight: 19.9 parts of picramic acid are dissolved in six hundred parts of hot water with the addition of 8.5 parts of ammonia liquor, (containing twenty per cent. of $NH_3$.) After cooling it is diazotized in the known manner with the aid of seven parts of sodium nitrite and of a suitable quantity of hydrochloric acid. The diazo derivative, which separates during this operation, is isolated by filtration and then stirred into a solution which has been prepared from two hundred parts of water, six parts of sodium acetate, and twenty-nine parts of the sodium salt of amidophenylglycin sulfonic acid of the formula:

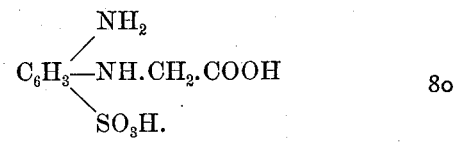

The mixture thus obtained is further stirred for about twelve hours. Subsequently it is heated to about 80° centigrade and then mixed with a suitable quantity of common salt. Finally the finished dyestuff is filtered off, pressed, dried, and pulverized.

The new coloring-matter represents a dark green powder of a metallic luster soluble in water with a brownish-red color. It is the sodium salt of an acid having most probably the formula:

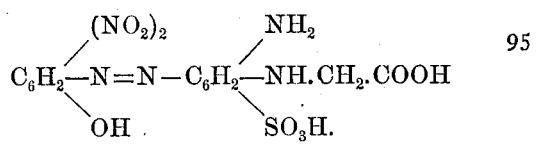

By concentrated sulfuric acid (of 66° Baumé)

it is dissolved, yielding a bluish-red solution, the color of which changes into yellowish-brown on the addition of a small quantity of ice, while a yellowish-brown precipitate is separated therefrom on adding a larger quantity of ice.

The new dyestuff yields on unmordanted wool in acid-baths reddish-brown shades, which by a subsequent treatment with potassium bichromate are changed into deep-brown shades fast to milling and to light.

Very similar results are obtained if instead of the metaämidophenylglycin sulfonic acid other of the above-defined dyestuff components are used.

Having now described our invention and in what manner the same is to be performed, what we claim as new, and desire to secure by Letters Patent, is—

1. The process for producing new monoazo dyestuffs by first combining the diazo derivatives of picramic acid with certain derivatives of metadiamido compounds of the benzene series having the formula:

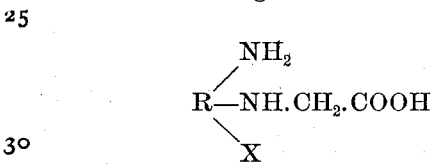

R meaning a radical of a hydrocarbon of the benzene series, X a hydrogen atom which may be replaced by a sulfo group, secondly isolating the dyestuffs thus obtained substantially as hereinbefore described.

2. The process for producing a new monoazo dyestuff by first combining a diazo derivative of picramic acid with metaämidophenylglycinmonosulfonic acid, secondly isolating the dyestuff thus produced, substantially as hereinbefore described.

3. As new articles of manufacture the new monoazo dyestuffs, being alkaline salts of acids having most probably the formula:

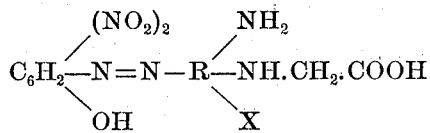

R meaning a radical of a hydrocarbon of the benzene series, X a hydrogen atom which may be replaced by a sulfo group, which dyestuffs are when dry and pulverized dark powders, soluble in water with a brownish-red color, dyeing wool in acid-baths from reddish-brown to brown shades which by a subsequent treatment with solutions of potassium bichromate are changed into fast and deep brown shades, substantially as hereinbefore described.

4. As a new article of manufacture the new monoazo dyestuff, being an alkaline salt of an acid having most probably the formula:

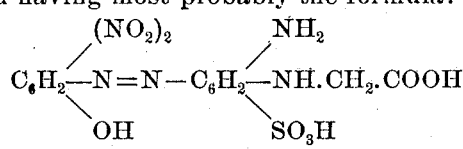

which is, when dry and pulverized, a dark green powder of a metallic luster, soluble in water with a brownish-red color, soluble in concentrated sulfuric acid yielding a bluish-red solution the color of which changes into yellowish-brown on the addition of a small quantity of ice while a yellowish-brown precipitate is separated therefrom on adding a larger quantity of ice, dyeing wool in acid-baths reddish-brown shades which by a subsequent treatment with a solution of potassium bichromate are changed into deep-brown shades fast to milling and to light, substantially as hereinbefore described.

In testimony whereof we have signed our names in the presence of two subscribing witnesses.

PHILIPP OTT.
ADOLF ISRAEL.
RICHARD KOTHE.

Witnesses:
R. E. JAHN,
OTTO KÖNIG.